June 8, 1926. 1,588,142
F. L. ROHRBACH
ANTIFRICTION CABLE SUPPORT FOR HEAVY DUTY POWER CABLES
Filed July 12, 1922

Inventor
Franklin L. Rohrbach
by Carl N. Crawford
Attorney

Patented June 8, 1926.

1,588,142

UNITED STATES PATENT OFFICE.

FRANKLIN L. ROHRBACH, OF SPOKANE, WASHINGTON.

ANTIFRICTION CABLE SUPPORT FOR HEAVY-DUTY POWER CABLES.

Application filed July 12, 1922. Serial No. 574,394.

The object of this invention is to provide a means of supporting a heavy duty power cable at the man-hole end of a conduit.

It is well known that these cables longitudinally contract and expand from a fraction of an inch to more than an inch as the current varies. Now at the man-hole end of the conduit, there is considerable slack in the cable, in other words, that portion of the cable which extends across the man-hole proper, loops downwardly and as the cable moves, under the action of expansion and contraction, the portion supported at the terminal of the conduit is subjected to severe wear such as in time will cause a burn-out. Various scoops, collars and other devices of a sleeve-like nature have been resorted to to protect that portion of the cable. However, these expedients work out of the conduit ends, on successive movements of the cable, or work endwise on the cable and very soon, the cable is again in direct wearing contact with the man-hole end of the conduit.

Further, those portions of certain cables extending from the ends of the conduits and across the man-hole proper, are covered with a coating of concrete, cement or the like, and this protection of course greatly enlarges the cross section of the cable and increases the weight thereof. In view of the travel of the cable, under expansion and contraction, the ends of this projecting coating could not be extended close to the end of the conduit as otherwise, contraction would disrupt the ends of the coating when the cable contracts.

It is the object of this invention to eliminate the above and many other defects by providing anti-friction means at the man-hole terminals of the conduits.

A further object is to provide a device wherein the enlarged ends of the cables can extend into the conduits, thereby affording more complete protection, the extension of the enlarged ends being sufficient so that as the cable expands and contracts, the end of the protective coating will always be inside the conduit and inwardly of the wall of the man-hole.

A further object is to provide a device of this character which is especially useful in installations where the conduits are relatively closely or compactly spaced.

My invention resides not only in the combination, but also in novel articles of manufacture, all as will be more fully described in connection with the accompanying drawing and more particularly pointed out in and by the appended claims.

In the drawing:—

Like characters of reference designate similar parts throughout the different figures of the drawing.

Figure 1:
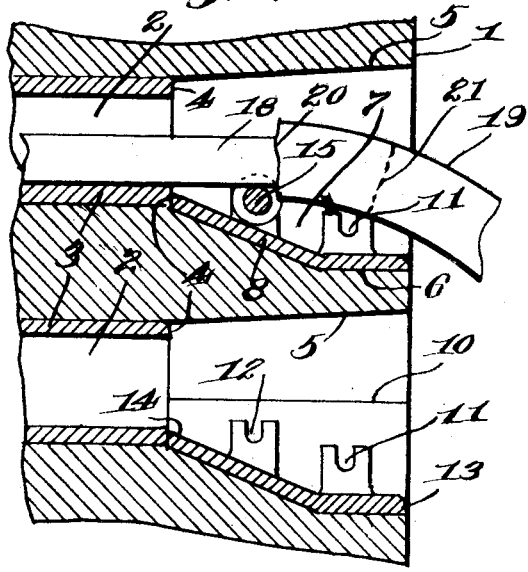
Fig. 1, is a vertical sectional view through the conduits at the man-hole ends and showing the preferred form of my invention in new installations and where the conduits are spaced apart in good workable clearance.
Figure 2:
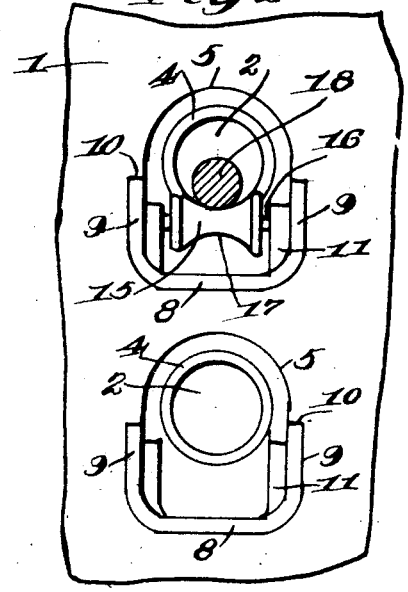
Fig. 2, is a face view looking toward a man-hole wall and from the right of Fig. 1.

First referring to Figs. 1 and 2, 1 designates one of the man-hole walls into which conduits 2, terminate. The conduits proper, designated at 3, terminate a distance inside the wall 1, at 4. From the ends 4, I prefer to bell the ends of the conduit bores, the upper walls 5, being arcuate and only slightly enlarged, while the lower walls 6, slope downwardly a considerable distance from the bottom of the conduit ends 4. I permanently fix in these enlarged ends, roller housings 7, the bottom walls 8, of which abut against the lower ends 4, and extend to points flush with the wall 1. The side walls 9, take the form clearly shown in Fig. 2. These housings are or may be cemented into the structure of the man-hole and I provide the same with ribs, as will be later described, or similar means, to effect firm anchorage. The line of the side wall tops, is clearly indicated in Fig. 1, at 10. Thus, the shape of the housing will be clear, and it will be noted that the housing forms a continuation or extension of the conduit, at least as regards its lower portion.

On the inside of walls 9, I provide means for journalling a roller, and such means may take the form of upwardly opening slots, 11 and 12, in opposite pairs, one pair being nearer the man-hole end 13, and the other nearer the conduit end 14. A cable supporting roller 15, having suitable trunnions 16, is shown journalled in the rearmost slots. The periphery of this roller is shown concave, as at 17, and the curvature corresponds to the curvature of the lower interior of conduit 2. Thus the cable 18, rides on the upper periphery of the roller and is supported at a relatively considerable elevation from the bottom of the housing.

Now the cable is shown provided with a protecting coating 19, which greatly enlarges its cross section, and the end of which coating is shown at 20, as being closely disposed adjacent the roller 15. This will be the position when the cable is cold, or contracted. When the cable is heated, by a heavy current, the cable will expand, and the dotted line 21, will indicate the position of the end of the coating, which is not only inside the conduit bore, but which is supported by the roller so that it cannot scrape along the bottom edge 13. This would be true even without the coating. However, this coating is a protection to the cable as regards that portion which spans the manhole proper, and it is more effective if it extends into the conduit bore, irrespective of the position of the cable under expansion or contraction. The slots 11, will support the roller at a lower elevation but nearer the end 13, and consequently the roller can be disposed in these slots and the shoulder or end 20, of the coating, could extend even further into the conduit bore.

For clearness of illustration, I have omitted the cable in the lower conduit of Fig. 1.

Figure 3:
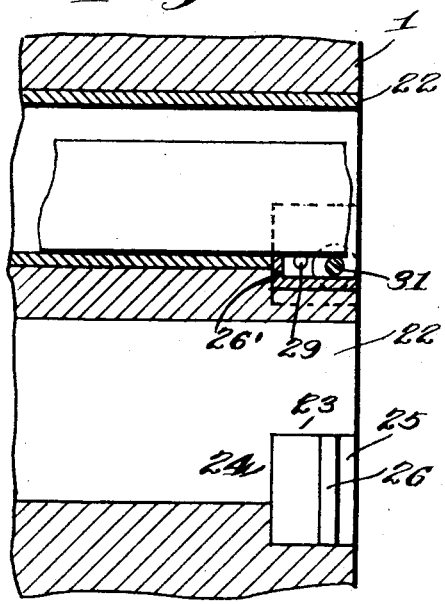
Figure 3, is a view similar to Fig. 1, showing the preferred form of my invention where the conduits are in closely spaced relation.

In either new or old installations where the conduits are relatively closely spaced, I prefer to employ the form shown in Figs. 2 and 3.

Figure 4:
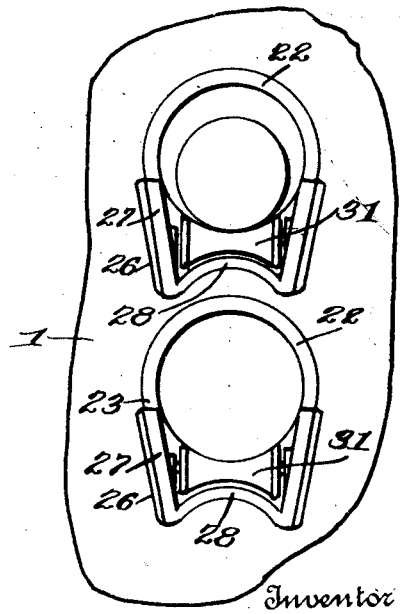
Fig. 4, is a view similar to Fig. 2, looking from the right of Fig. 3.

In this form, the conduits 22, extend full outwardly and flush with wall 1, at their upper portions, and are not belled. The lower portions are cut away on line 23 and 24 and a housing 25 is inserted, the same having ribs 26, to lock into the structure of the man-hole. These housings have vertical end walls 27 which are curved to correspond to the curvature of the cylindrical conduits 22, or with those portions with which the walls 26' are contiguous. The side walls 27, abut against the cut away walls 23, and the ends of the housings are open to the manhole. The bottom walls 28, are upwardly curved with a view of permitting a very close spacing of the conduits, as shown in Fig. 4. These housings have pairs of slots 29 and 30, whereby trunnioned rollers 31, may be journalled forwardly or rearwardly in said housings. The roller 31, is concave, as in the preferred form, and the concavity is in correspondence with the curvature of bottom wall 28, as clearly shown in Fig. 4.

In both forms of my invention, the whole device is disposed inside of the wall 1, and is therefore not obstructive. Further, in both forms, the cable is supported in a manner to entirely avoid scraping of its insulation.

A telephone, telegraph or other cable may be relatively large in diameter and heavy, but, because it is not a lighting or power cable, it does not develop enough heat to cause contraction and expansion. My invention is primarily designed for that class of cable which is a heavy duty cable and which is heated by the current passing therethrough and which moves lengthwise, due to contraction and expansion and would therefore, in the absence of my invention, be damaged by scraping contact with the man-hole end of the duct. This kind of cable, is either a power or a lighting cable.

I claim:—

1. A cable conduit having a lower portion of its man-hole end cut away, a roller housing shaped to form a contiguous extension of said cut away portion and being disposed inside or at least flush with the wall of the man hole, and a roller rotatably mounted in said housing in supporting relation with the downwardly drooping portion of the cable extending into the manhole.

2. A cable conduit having a lower portion of its man-hole end cut away, a U-shaped cable supporting roller housing fixedly mounted in the structure of the man-hole wall and shaped to form a contiguous extension of the cut away portion of said conduit, a cable supporting roller mounted in said housing and having a concave periphery, the lower wall of said housing being correspondingly concave whereby the conduits may be correspondingly more compactly spaced in initial installations.

3. As an article of manufacture, a roller housing having an open end and side and back walls shaped to fit a mutilated conduit end and form a contiguous extension therefrom, a concave cable supporting roller journalled in said housing, and said housing having a bottom concave wall close to and corresponding to the concavity of said roller.

4. As a means of supporting a heavy duty, coated cable, a cable conduit having a lower portion of its man-hole end cut away, a roller housing extending from such cut away end outwardly to the wall of the man-hole proper and being inclined downwardly from said conduit toward its man-hole end of said housing, and a cable supporting roller journalled in said housing near the conduit end of the latter, whereby the enlarged cemented portion of the cable will be supported out of scraping contact with the downwardly inclined housing and whereby said enlarged cable portion may travel toward and away from said roller without emerging into the man-hole proper.

In testimony that I claim the foregoing as my own, I hereby affix my signature.

FRANKLIN L. ROHRBACH.